United States Patent
Parkinson

[15] 3,699,166
[45] Oct. 17, 1972

[54] PROCESS FOR FORMING CARBAMYL THIOCARBAMYL DISULFIDES

[72] Inventor: Alan R. Parkinson, Harwood, near Bolton, England

[73] Assignee: The Goodyear Tire & Rubber Company, Akron, Ohio

[22] Filed: April 22, 1970

[21] Appl. No.: 30,953

[52] U.S. Cl..........260/567, 260/246 B, 260/293.63, 260/709
[51] Int. Cl............................................C07c 153/05
[58] Field of Search...........................260/247.1, 567

[56] References Cited

UNITED STATES PATENTS 3,318,763   5/1967   Brooks et al...............260/567

Primary Examiner—Alex Mazel
Assistant Examiner—Jose Tovar
Attorney—F. W. Brunner and Wolfe, Hubbard, Leydig, Voit & Osann

[57] ABSTRACT

The process for forming carbamyl thiocarbamyl disulfides and related compounds by passing a molecular oxygen oxidizing agent through a liquid reaction medium such as water, containing a thiuram monosulfide including the following structural formula

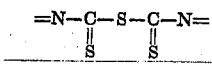

and catalytic amounts of nitrous acid. These compounds may be utilized as vulcanization accelerators.

9 Claims, No Drawings

PROCESS FOR FORMING CARBAMYL THIOCARBAMYL DISULFIDES

This invention relates to a process for forming organic compounds and more particularly to an improved process for synthesizing carbamyl thiocarbamyl disulfide and related compounds.

These compounds have previously been made by reacting bromine in a non-aqueous medium with tetramethyl thiuram monosulfide to form a bromine complex. The bromine complex is then subjected to hydrolysis with ice-water. The yields are generally in a range of about 60 percent and an impure product is obtained.

Another process for forming such compounds consists of treating the desired thiuram monosulfide as a cold water slurry with air or oxygen which is admixed with catalytic amounts of nitrogen tetroxide.

An object of the present invention is to provide a method of forming carbamyl thiocarbamyl disulfide and related compounds by a process which is economical yet provides superior yields.

A further object of this invention is to provide a process for forming such compounds wherein the product stability is increased.

A still further object of the present invention is to provide a process for forming compounds of the above-identified type which does not require the handling of toxic gases.

Another object of the present invention is to provide a process for forming such compounds which may be carried out with a short reaction time at moderate temperatures.

Other objects and advantages will become apparent from the description of the invention which follows.

In accordance with the present invention substituted carbamyl thiocarbamyl disulfides including the following structural formula:

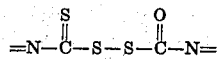

may be prepared by passing a molecular oxygen oxidizing agent through a liquid reaction medium, comprising nitrous acid and a thiuram monosulfide including the following structural formula:

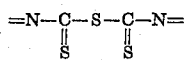

The group or groups linked to the nitrogen may be substituted or unsubstituted alkyl, cycloalkyl or aralkyl radicals and may be joined through a member of the group consisting of —CH$_2$— and -0- to constitute with the attached nitrogen atom a heterocyclic radical. Representative examples of the groups are methyl, ethyl, isopropyl, benzyl and cyclohexyl radicals. Representative examples of the heterocyclic radicals include morpholino and piperidino radicals. Yields of 90 percent or more may be obtained with purities that may be as high as about 99 percent.

Describing the process of the present invention in detail, a thiuram monosulfide is slurried with a liquid medium of high polarity, such as water. At least one molar equivalent of an acid such as sulfuric acid or hydrochloric acid is then added to the suspension. A catalytic amount of an alkali nitrite or alkaline earth nitrite is then introduced at a controllable rate into the stirred mixture to form in solution the nitrous acid. It is preferred to employ lithium, sodium or potassium nitrite. The nitrite should be introduced at a rate which does not create foaming due to the liberation of oxides of nitrogen. It has been found that from about 20 to about 50 percent of the theoretical amount of the nitrite will provide satisfactory catalytic results in most situations. Preferably alkaline earth nitrites are not used with sulfuric acid since insoluble salts will be formed, thereby necessitating recovery of the product by techniques such as recrystallization.

During this time, the molecular oxygen oxidizing agent is passed through the reactants in a vigorous stream. To serve as the oxidizing agent, molecular oxygen either alone or with an inert diluent could be employed. Additionally, compounds capable of yielding oxygen under the reaction conditions could be employed. Representative examples include gaseous oxygen, air and hydrogen peroxides.

The reaction may be conveniently carried out at room temperature, and a range of from 0° to 100° C. is generally suitable. When substantially pure oxygen is used as the oxidizing agent, the reaction is generally completed after about 30 minutes. Two or 3 hours may be required when the oxidizing agent is air or the like.

When used commercially, it may be desirable to carry out the process of the present invention in more than one vessel. For example, the acid added to assist in the in situ formation of the nitrous acid could be added to the monosulfide slurried with water in one vessel. The resulting solution could then be pumped or otherwise transported to a second vessel where the nitrite is added and the oxidizing agent passed through the liquid reaction medium.

The following examples are illustrative of the invention but not in limitation thereof. Unless otherwise indicated, all parts are by weight.

EXAMPLE 1

Sixty-three grams of tetramethyl thiuram monosulfide was slurried in 400 ml. of water containing a few drops of a dispersing agent. A solution of sulfuric acid (18 ml. of concentrated sulfuric acid in 100 ml. of water) was then added. Oxygen was vigorously bubbled into the mixture while a solution of sodium nitrite (42 grams of sodium nitrite in 100 ml. of water) was added slowly. The reaction ceased after a few minutes because of excessive foaming. Twenty-five drops of an anti-foaming agent were added and the reaction continued for about 10 minutes, at which time it appeared to be complete. The mixture was filtered, washed well with water and spread out to dry. The product weighed 61 grams, corresponding to a yield of 90 percent. The product possessed a purity of 97 percent and exhibited a melting point of 101° to 103° C.

EXAMPLE 2

To test the stability a sample prepared in accordance with the process set forth in Example 1 was stored in a closed container (i.e. — a sample bottle with a screw top) at room temperature and, after a predetermined period, the melting point was determined.

The melting points were compared with those of samples that had been prepared by reacting bromine in a non-aqueous environment with tetramethyl thiuram monosulfide and then hydrolyzing to give dimethylcarbamyl dimethylthiocarbamyl disulfide. The preparation is described in more detail by E. C. Gregg in Volume 4, page 3,691 of the Journal of American Chemical Society (1952). Tee samples prepared by the Gregg method, based upon visual observations, decompose within about three months if not recrystallized. If recrystallized, they do not decompose as readily. Samples B through D were conventionally recrystallized.

The melting points were as follows:

| Sample Prepared by the Process of Example 1 | Melting Point, °C | | | |
|---|---|---|---|---|
| | Initial | After 12 weeks | After 46 weeks | After 48 weeks |
| A | 101–103 | — | 82–103 | — |
| Prepared by the Gregg method | | | | |
| B | 107–108.5 | 103.5–104.5 | — | 80–90 |
| C | 107–108.5 | 104.5–105.5 | — | 87–100 |
| D | 107–108.5 | 104.5–105.5 | — | 87–100 |

Thus, as has been seen, the present invention provides a method of synthesizing in superior yields carbamyl thiocarbamyl disulfide. These compounds may be used as vulcanization accelerators. The process may be carried out at moderate temperatures with a reaction time of as little as 30 minutes. Additionally, the products formed by this process may have a purity as high as 97 to 99 percent or more and exhibit stability in unrecrystallized form which is equivalent to the products of prior processes that are recrystallized.

While certain representative embodiments and details have been shown for the purpose of illustrating the invention, it will be apparent to those skilled in the art that various changes and modifications may be made therein without departing from the spirit and scope of the invention.

I claim as my invention:

1. A process for forming a carbamyl thiocarbamyl disulfide which comprises adding a tetraalkyl thiuram monosulfide selected from the group consisting of methyl, ethyl and isopropyl and an acid together to form a liquid reaction medium and thereafter reacting the reaction liquid medium concurrently with (a) a nitrite selected from the group consisting of alkali nitrites and alkaline earth nitrites, the nitrite being added in an amount sufficient to provide a catalytic amount of nitrous acid and (b) an oxidizing agent affording molecular oxygen under the reaction conditions.

2. The process of claim 1 wherein said tetraalkyl thiuram monosulfide is tetramethyl thiuram monosulfide.

3. The process of claim 1 wherein the liquid medium is water.

4. The process of claim 1 wherein said oxidizing agent is air.

5. The process of claim 1 wherein said oxidizing agent is oxygen.

6. The process of claim 1 wherein the temperature is maintained in the range of from about 0° to about 100° C.

7. The process of claim 1 wherein the nitrite is an alkali nitrite.

8. The process of claim 1 wherein said acid is sulfuric and said nitrite is sodium nitrite.

9. The process of claim 8 wherein, based upon the thiuram monosulfide, said sulfuric acid is present in an amount of at least one molar equivalent and said sodium nitrite is present in an amount of from about 20 to about 50 percent of its molar equivalency.

* * * * *